US010616772B2

(12) United States Patent
Soelberg et al.

(10) Patent No.: US 10,616,772 B2
(45) Date of Patent: Apr. 7, 2020

(54) SYSTEMS AND METHODS FOR USING FEMTOCELL FUNCTIONALITY IN USER DEVICES

(71) Applicants: AT&T Mobility II LLC, Atlanta, GA (US); AT&T Intellectual Property I, L.P., Atlanta, GA (US)

(72) Inventors: Emily Lyons Soelberg, Atlanta, GA (US); Venson Shaw, Kirkland, WA (US); George Hirvela, Carrollton, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/459,130

(22) Filed: Mar. 15, 2017

(65) Prior Publication Data

US 2018/0270670 A1 Sep. 20, 2018

(51) Int. Cl.
*H04W 16/26* (2009.01)
*H04W 16/32* (2009.01)
*H04W 88/04* (2009.01)
*H04W 28/02* (2009.01)
*H04W 84/04* (2009.01)

(52) U.S. Cl.
CPC .......... *H04W 16/26* (2013.01); *H04W 16/32* (2013.01); *H04W 28/0289* (2013.01); *H04W 84/045* (2013.01); *H04W 88/04* (2013.01)

(58) Field of Classification Search
CPC ..... H04W 16/26; H04W 4/046; H04W 16/32; H04W 28/0289; H04W 84/12; H04W 88/04

See application file for complete search history.

(56) References Cited

U.S. PATENT DOCUMENTS

| 6,477,154 | B1 | 11/2002 | Cheong et al. |
|---|---|---|---|
| 7,221,904 | B1 | 5/2007 | Gavrilovich |
| 7,990,912 | B2 | 8/2011 | Nix, Jr. et al. |
| 8,483,092 | B2 | 7/2013 | De Sousa et al. |
| 8,526,367 | B2 | 9/2013 | Darabi et al. |
| 8,649,819 | B2 | 2/2014 | Tonogai et al. |
| 8,670,388 | B2 | 3/2014 | Jiao et al. |

(Continued)

FOREIGN PATENT DOCUMENTS

| CA | 2568899 C | 12/2005 |
|---|---|---|
| CA | 2741885 A1 | 4/2011 |

(Continued)

OTHER PUBLICATIONS

Todd Mersch; "LTE Femtocell Roadmap From Concept to Reality"; White Paper; Radisys Corporation; ©2011; 7 pages.

(Continued)

*Primary Examiner* — Dominic E Rego
(74) *Attorney, Agent, or Firm* — BakerHostetler (57) ABSTRACT

A first user equipment is provided with femtocell functionality. The femtocell is instantiated based upon a user defined trigger. A second user equipment inside the area of coverage of a stationary transmitting component receives a message from the first user equipment that is outside the area of coverage of a stationary transmitting component. The second user equipment transmits the message to the stationary transmitting component.

20 Claims, 8 Drawing Sheets

(56) References Cited

U.S. PATENT DOCUMENTS

| | | | |
|---|---|---|---|
| 8,887,231 B2 | 11/2014 | Wohlert | |
| 9,001,740 B2 | 4/2015 | Darabi et al. | |
| 9,036,509 B1* | 5/2015 | Addepalli | H04W 4/046 370/259 |
| 9,154,322 B2 | 10/2015 | Naidu et al. | |
| 9,307,297 B2 | 4/2016 | Richman et al. | |
| 9,351,193 B2 | 5/2016 | Raleigh et al. | |
| 9,749,918 B2* | 8/2017 | Ljung | H04B 7/14 |
| 2005/0136834 A1* | 6/2005 | Bonta | H04L 29/12254 455/11.1 |
| 2006/0217121 A1 | 9/2006 | Soliman et al. | |
| 2007/0060050 A1* | 3/2007 | Lee | H04B 7/15542 455/13.1 |
| 2007/0133388 A1* | 6/2007 | Lee | H04B 7/155 370/206 |
| 2008/0242291 A1* | 10/2008 | Min | H04B 7/2606 455/422.1 |
| 2009/0017702 A1* | 1/2009 | Pizzi | H01R 4/363 439/812 |
| 2010/0177672 A1* | 7/2010 | Dayal | H04W 52/46 370/311 |
| 2010/0234071 A1* | 9/2010 | Shabtay | H04B 7/0408 455/562.1 |
| 2010/0261479 A1* | 10/2010 | Hidaka | H04L 45/12 455/445 |
| 2010/0295663 A1* | 11/2010 | Shoarinejad | H04W 52/288 340/10.1 |
| 2011/0294496 A1 | 12/2011 | Hirakawa et al. | |
| 2012/0094658 A1* | 4/2012 | Macias | H04W 48/18 455/426.1 |
| 2012/0225638 A1* | 9/2012 | Barnes | H04W 12/06 455/408 |
| 2013/0036228 A1* | 2/2013 | Take | H04L 67/14 709/227 |
| 2013/0083779 A1* | 4/2013 | Ahn | H04W 72/04 370/336 |
| 2013/0237245 A1* | 9/2013 | Tinnakornsrisuphap | H04W 64/00 455/456.1 |
| 2014/0207338 A1* | 7/2014 | Healey | G06F 7/00 701/45 |
| 2014/0226481 A1* | 8/2014 | Dahod | H04W 36/0055 370/235 |
| 2014/0243038 A1* | 8/2014 | Schmidt | H04W 4/90 455/552.1 |
| 2014/0256334 A1* | 9/2014 | Kazmi | H04W 28/18 455/450 |
| 2015/0163705 A1* | 6/2015 | Lu | H04W 36/0055 370/331 |
| 2015/0215575 A1* | 7/2015 | Rin | H04N 21/43632 386/231 |
| 2015/0264627 A1 | 9/2015 | Perdomo | |
| 2015/0327188 A1* | 11/2015 | Bagheri | H04W 52/383 455/426.1 |
| 2016/0021485 A1* | 1/2016 | Sallas | H04W 4/008 455/41.3 |
| 2016/0057761 A1* | 2/2016 | Panaitopol | H04W 72/085 370/329 |
| 2016/0212599 A1* | 7/2016 | Kudou | H04W 40/20 |
| 2016/0338103 A1* | 11/2016 | Martin | H04W 74/08 |
| 2016/0360343 A1* | 12/2016 | Shi | H04W 76/14 |
| 2017/0013509 A1* | 1/2017 | Ansari | H04W 36/22 |
| 2017/0027009 A1* | 1/2017 | Dumpala | H04B 7/15507 |
| 2017/0041734 A1* | 2/2017 | Oh | H04W 4/70 |
| 2017/0090865 A1* | 3/2017 | Armstrong-Muntner | H04R 29/001 |
| 2017/0126417 A1* | 5/2017 | Wu | H04L 12/189 |
| 2017/0164264 A1* | 6/2017 | Kato | H04W 28/14 |
| 2018/0035354 A1* | 2/2018 | Martin | H04W 40/12 |
| 2018/0076877 A1* | 3/2018 | Liu | H04L 47/12 |
| 2018/0077745 A1* | 3/2018 | Hase | H04W 76/14 |
| 2018/0138965 A1* | 5/2018 | Martin | H04B 7/15507 |
| 2018/0146507 A1* | 5/2018 | Tsuda | H04W 68/005 |
| 2018/0287866 A1* | 10/2018 | Yoon | H04B 7/15528 |
| 2018/0295481 A1* | 10/2018 | Kahtava | H04W 76/10 |
| 2018/0332552 A1* | 11/2018 | Martin | H04W 56/002 |
| 2018/0352522 A1* | 12/2018 | Sorrentino | H04W 76/14 |

FOREIGN PATENT DOCUMENTS

| | | |
|---|---|---|
| RU | 2492597 C2 | 9/2013 |
| WO | WO 2011/141931 A2 | 11/2011 |
| WO | WO 2012/155219 A1 | 11/2012 |

OTHER PUBLICATIONS

Haider et al.; "A Simulation Based Study of Mobile Femtocell Assisted LTE Networks"; IEEE Int'l Wireless Communications and Mobile Computing Conf.; 2011; 6 pages.

Wang et al.; "Cellular Architecture and Key Technologies for 5G Wireless Communication Networks"; 5G Wireless Communication Systems: Prospects and Challenges; IEEE Communications Magazine; Feb. 2014; p. 122-130.

Barlow et al.; "Femtocell Technology: Opportunities for SDR"; Symposium; 2012; 11 pages.

* cited by examiner

SYSTEMS AND METHODS FOR USING FEMTOCELL FUNCTIONALITY IN USER DEVICES

TECHNICAL FIELD

The following description relates generally to wireless communications and more particularly to systems and methods for providing femtocell functionality to user devices.

BACKGROUND

Today's cellular networks are implemented in large part by placing high power radios on top of towers to cover a broad geographic territory using licensed spectrum. However, deploying new towers is time consuming and expensive. There are congestion points including how much of the spectrum is used for each sector and how many devices can be simultaneously attached to a single tower at a time. Coverage is fixed and limited to how far the radio can transmit/receive, typically a small number of miles. Additionally, coverage is affected by buildings, trees, mountains, weather or other impediments to the radio signal. Thus the addition of coverage or capacity involves expensive options of either adding more site density or acquiring more spectrum (which involves expensive equipment deployments as well). Lack of capacity results in end users suffering from lower performance or the inability to use applications like high definition video, voice over LTE, etc.). Also, lack of capacity may impact battery life/power consumption in IoT devices which may attempt to retransmit due to congestion thereby unnecessarily consuming power.

Existing solutions to solving the added capacity problems include the use of microcells which are small versions of radio towers that are typically fixed equipment on homes or businesses and can carry traffic and operate to increase capacity/performance without having to install new towers or buy new spectrum. Another approach is the use of public/private WiFi, for example using home-based unlicensed WiFi that includes a channel that is open to public consumption alongside the one for the homeowner. Applications have also been developed that enable peer-to-peer mobile Internet connection sharing with faster and more efficient data transmissions by automatically and actively choosing and switching to the best available network without requiring users to manually search available networks to find the best one available. With those applications a user can send a message and if not in wireless coverage but in range of other devices with an application client, it will use short-range radio technology (e.g. Bluetooth) to pass the message along until it has a path out to the internet—or can be delivered peer-to-peer to another user in the mesh. Another approach is to provide femtocell capability to devices within the communications network. A non-femto enabled device and/or a femto enabled device can communicate with a femto enabled device in the same geographical area for femto-enabled peer-to-peer communication. Two non-femto enabled devices can be provided femto functionality through utilization of a femto enabled device, which operates as a hub between the two devices. Other aspects relate to enhanced position determination, adaptive coverage enhancement, local mobile networks, open access femtocells without a backhaul, and local broadcast of media though utilization of femto enabled devices.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One general aspect includes a method including: instantiating, based upon a user defined trigger, a first femtocell module in a first user equipment, where the first user equipment is outside an area of coverage of a stationary transmitting component; receiving a message from the first user equipment in a second user equipment having a second femtocell module, where the second user equipment is inside the area of coverage of the stationary transmitting component; and transmitting the message from the second user equipment to the stationary transmitting component. Other embodiments of this aspect include corresponding computer systems, apparatus, and computer programs recorded on one or more computer storage devices, each configured to perform the actions of the methods.

One general aspect includes a system including a first user equipment comprising a first femtocell module, and a first processor. The first user equipment is disposed outside the coverage area of a stationary transmitting component. The system also includes a second user equipment disposed inside the area of coverage of the stationary transmitting component. The second user equipment is provided with a second femtocell module and a second processor. In the system the first processor is configured to instantiate the first femtocell module based upon a user defined trigger and direct the transmission of a message to the second user equipment. The second processor is configured to transmit the message to the stationary transmitting component.

Another general aspect includes computer readable media comprising program code that when executed by a programmable processor causes the processor to execute a method. The computer readable media includes a program code for instantiating, based upon a user defined trigger, a first femtocell module in a first user equipment, where the first user equipment is outside an area of coverage of a stationary transmitting component. The computer readable media also includes program code for receiving a message from the first user equipment in a second user equipment having a second femtocell module, where the second user equipment is inside the area of coverage of the stationary transmitting component. The computer readable media also includes program code for transmitting the message from the second user equipment to the stationary transmitting component.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF ILLUSTRATIVE EMBODIMENTS

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with User Equipment (UE). A UE can also be called, and may contain some or all of the functionality of a mobile device, subscriber unit, subscriber station, mobile station, mobile wireless terminal, wireless communication device, wireless communication apparatus, user agent, or user device. A UE can be a cellular telephone, a cellular mobile device, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless equipped automobile, a wireless modem card and/or another processing device for communicating over a wireless system.

Moreover, various aspects are described herein in connection with stationary transmitting device such as a base station. A base station may be utilized for communicating with wireless terminal and can also be called, and may contain some or all of the functionality of, an access point, Node B, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
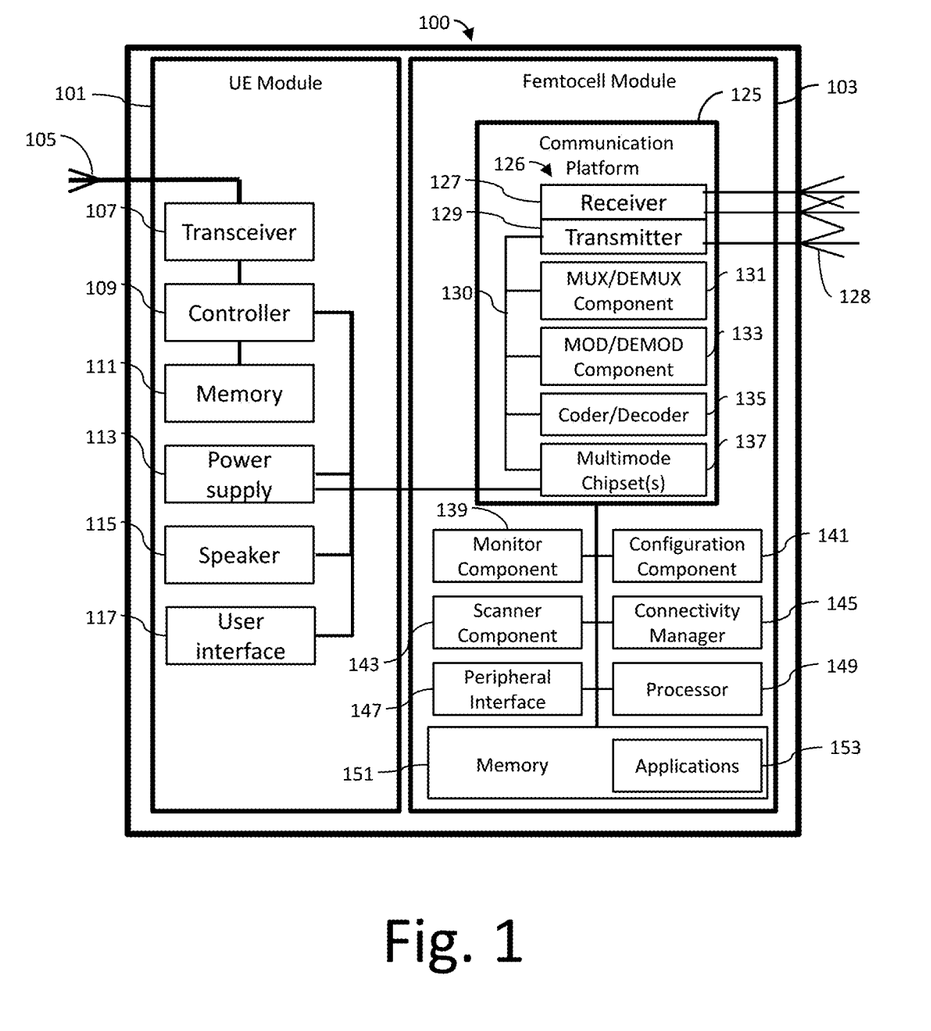
FIG. 1 is a block diagram of a hybrid femtocell equipped user equipment.

As shown in FIG. 1, User Equipment Femto Hybrid device, (hybrid device 100) includes user equipment components, UE module 101, and Femtocell components 103. The hybrid device 100 may be in the form of a smart phone, mobile device, a laptop computer, a tablet, a desktop computer, an IoT device, or any other device that provides network connectivity to a base station Node B/eNode B. UE module 101 may include a transceiver 107 coupled to an antenna 105, a controller 109, a memory 111, a power supply 113, a speaker 115, and a user interface 117. Not all of the foregoing components are required for the hybrid device. For example an IoT device may not require a user interface or speakers. Depending on the functionalities offered by the UE module 101, the user interface 117 may include a microphone, a display, a joystick, a keyboard/keypad, a touch sensitive display, a dial, navigation keys and/or a pointing device (such as a mouse, trackball, touchpad, etc.). However, additional and/or fewer elements of the user interface 117 may actually be provided.

The transceiver 107 is a combination of a transmitter and a receiver. The transceiver 107 may also include a wireless local area network interface transceiver (not shown) configured to establish an ad hoc wireless connection, such as a Bluetooth, Wi-Fi-, and/or IR connection. In addition, the transceiver 107 may include a public land mobile network (PLMN) transceiver (not shown) configured to establish wireless connections through a fixed network access point, such as a cellular base station While a single antenna 105 is illustrated in FIG. 1, separate antennas may be provided for the wireless local area network interface transceiver and/or the PLMN transceiver.

The controller 109 is coupled to the transceiver 107, the memory 111, the speaker 115, and the user interface 117. The controller 109 may be, for example, a commercially available or custom microprocessor that is configured to coordinate and manage operations of the transceiver 107, the memory 111, the speaker 115, and the user interface 117.

The hybrid device 100 includes femtocell components 103. The femtocell component 103 includes a communication platform 125 to enable wireless service. Communication platform 125 comprises a transceiver 126 including a receiver component 127 and a transmitter component 129 with associated antennas 128. Although only one transceiver 126 is shown, the communication platform 125 may include more than one transceiver 126. The transceiver 126 may transmit and receive signal via antenna 128 or via a peripheral interface 147. The peripheral interface 147 may be functionally connected to a security gateway (SeGW) (not shown) and a home Node B Gateway (HNB-GW) (not shown); that may serve as primary home gateway node for the femtocell components 103. The HNB GW serves the purpose of a radio network controller presenting itself to the core network (CN) as a concentrator of femtocell connections, i.e. the HNB GW provides concentration function for the control plane and provides concentration function for the user plane. The security gateway provides secure access for subscribers roaming between trusted and untrusted networks. Transceiver 126 may convert a signal from analog to digital and vice versa. In addition, transceiver 126 can divide a single data stream into multiple parallel data streams, or perform the reciprocal operation; such operations are typically conducted in various multiplexing schemes.

Communication platform 125 comprises electronic components that enable processing and manipulation of signals received and transmitted by the femtocell components 103 in accordance with various radio technology protocols (e.g., 5G. 3GPP UMTS, 3GPP LTE etc.). Components in communication platform 125 exchange information through a bus 130, which may be a system bus, an address bus, a data bus, a message bus, or a reference link or interface. The electronic components may include in addition to transceiver 126 a multiplexer/demultiplexer (mux/demux component 131), a modulator/demodulator component 133, a coder/decoder 135, and a set of one or more chipsets, e.g., multi-mode chipset 137. Functionally coupled to transceiver 126 is the mux/demux component 131 that enables processing or manipulation of signals by combining multiple analog or digital signals into one signal over a shared medium in the case of multiplexing or breaking up one data stream into several streams in the case of demultiplexing. The mux/demux component 131 may multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). The modulator/demodulator component 133 provides the capability to modulate and demodulate information according to a variety of modulation techniques. Modulation is the process of varying one or more properties of a carrier signal with a modulating signal that typically contains information to be transmitted. The modulator/demodulator component 133 is functionally coupled to mux/demux component 131 via the bus 130. Processor 149 enables, at least in part, femtocell components 103 to process data for multiplexing/demultiplexing, and modulation/demodulation. Although a processor 149 is shown as a component of femtocell components 103, the functionality of the processor 149 may be combined with the functionality of the controller 109 in the UE module 101.

Communication platform 125 may also include a coder/decoder 135 that may code voice into digital form in accordance with one or more coding/decoding schemes suitable for communication through transceiver 126. The coding/decoding schemes, or related procedures, may be stored as instructions in memory 151. Coder/decoder 135 may also extract information from data streams coded in accordance with spatial multiplexing scheme.

In addition, communication platform 125 can process signals originating in a wireless environment. The signals may comprise radio frequency (RF) signals, microwave signals, and other signals such as infrared (IR) signals. As new radio technologies become standardized, or available, a network operator that provides telecommunication service via femtocell network can introduce such technologies in the set of radio technologies that can be utilized for telecommunication through a hybrid device 100. Proper frequency planning would be designed to avoid self interference/degradation (Ex. avoiding transmitting/receiving on the same frequency). This frequency planning would also be coordinated with the macro network to avoid noise rise impacts. The frequencies used for the downlink from the hybrid device 100 could be unique than those used in the macro network to avoid interference situation.

In hybrid device 100, multi-mode chipset 137 can enable the femtocell components 103 to operate in multiple communication modes through various radio network technologies (e.g., second generation (2G), third generation (3G), fourth generation (4G)), fifth generation (5G) or deep-space satellite-based communication in accordance with disparate technical specifications, or standard protocols, for the radio network technologies or satellite communication. The multimode chipset 314 may enable, at least in part, communication platform 125 to operate in accordance with standard protocols specific to a telecommunication mode of operation, e.g., Long Term Evolution (LTE) based communication. The hybrid device 100 would have the additional front end design to handle transmission to a macro site and transmission to the other users simultaneously.

Femtocell components 103 may also include a display interface (not shown), which can display information and enable the entry of data associated with functions that control operation of femtocell components 103.

Femtocell components 103 can include a power supply, or draw power from the power supply 113 of the UE module 101. The power supply 113 may be rechargeable and may include transformers to provide power levels that can operate femtocell components 103. The hybrid device 100 may have additional power amplifiers in the RF design to allow for transmission on the downlink channels to serve the other mobile users. Typical macro sites have a 40 W transmitter for the downlink. The hybrid device 100 would be limited to power limits for devices (<few watts) imposed by regulatory bodies such as the FCC in the United State, but could still provide a link budget to support scenarios defined by using lower band frequencies and reduced carrier bandwidth (e.g. LTE 1.4 MHz vs 20 MHz where power per Physical Resource Block (PRB) can be increased) in order to serve the other users.

Femtocell components 103 may include a monitor component 139 to enable evaluation of performance of a telecommunication channel established by femtocell components 103 with the gateway node (not shown).

Femtocell components 103 may include processor 149 that can be configured to enable or that enable functionality to any component within femtocell components 103. Processor 149 is functionally coupled to each functional element within femtocell components 103 and to memory 151 through bus 130. One or more functional elements that comprise femtocell components 103 can reside within memory 151 as one or more sets of code instructions that, when executed by processor 149, implement the various functional elements and described functionality thereof. Processor 149 may use self-organizing techniques to detect nearby macrocells, adjust power, change frequencies and change spreading codes. The processor 149 would enable coordination of the eNode B neighbor relations of the macro network in order to be able to hand in/hand out calls.

Processor 149 also can supply information to and retrieve information from memory 151. Such information can enable, at least in part, operation of or can provide, at least in part, functionality to communication platform 125, and at least a portion of functional elements therein; display interface and functional element(s) therein; as well as other operational components (not shown) of femtocell components 103. The information can include at least one of code instructions, code structure, data structures, or the like.

Processor 149 can execute computer-executable code instructions stored in memory 151, for example within application storage 153 to provide, at least in part, the described functionality of femtocell components 103. Such computer executable code instructions can include program modules or software applications or firmware applications that implement various methods described in the subject specification and associated, at least in part, with functionality or operation of femtocell components 103.

Figure 2:
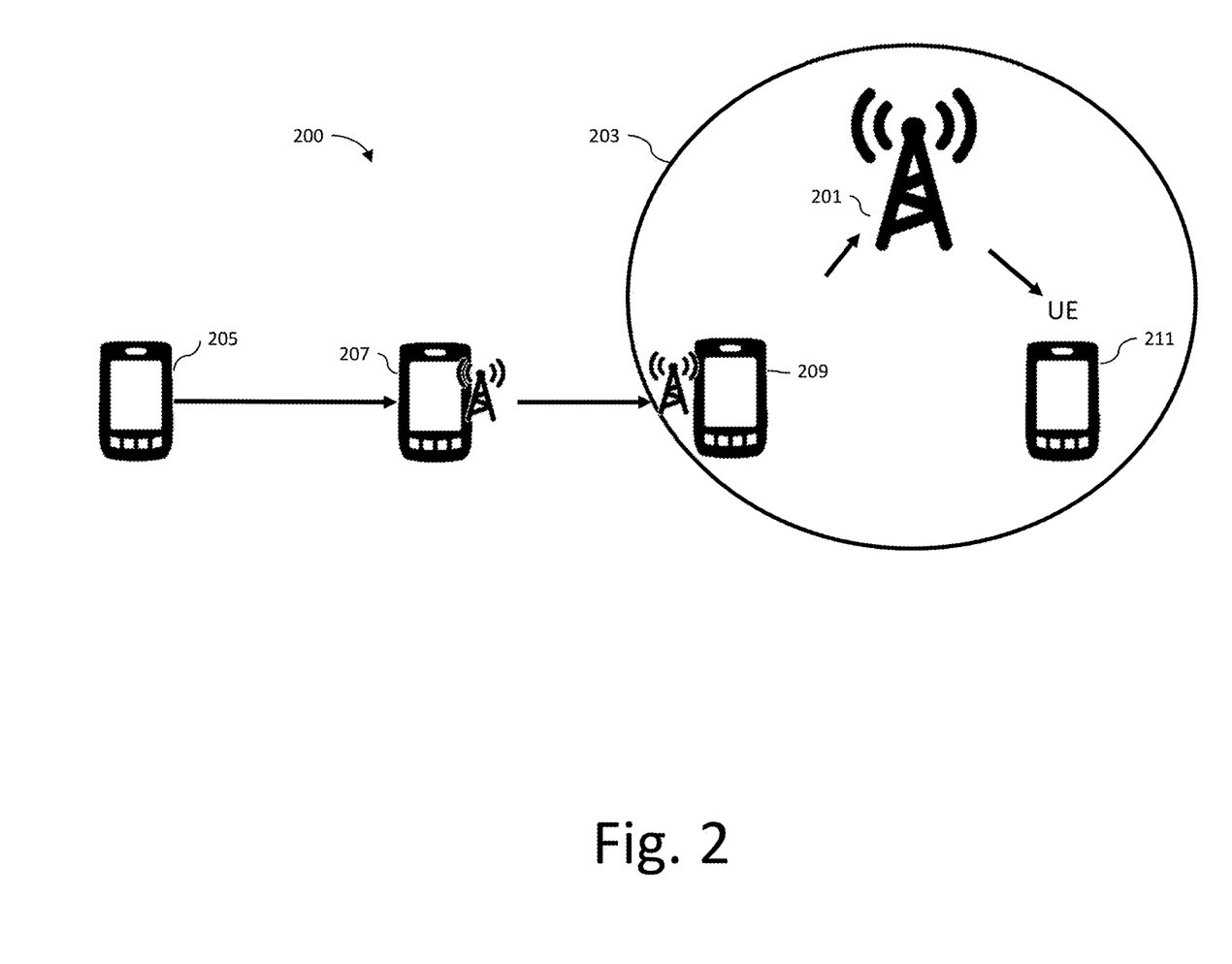
FIG. 2 is a block diagram of an example system through which a hybrid user devices are used to transmit messages from a user equipment that is outside the coverage area of a stationary transmitting component to a user equipment within the coverage area of the stationary transmitting component.

FIG. 2 illustrates system 200 in which a hybrid device such as hybrid device 100 in FIG. 1 can be used to send messages from UE 205 to UE 211. The system includes a stationary transmitting device 201 having a coverage area 203. The system also includes UE 205, hybrid device 207, hybrid device 209 and UE 211. In this example, UE 205 and hybrid device 207 are outside the coverage area 203. Hybrid device 209 and UE 211 are within the coverage area 203. In operation, UE 205 would scan the band for hybrid device frequencies. When the UE 205 frequency for hybrid device 207 it would connect to the hybrid device 207. Hybrid device 207 would be dynamically instantiated based upon user-defined trigger from UE 205. Examples of user defined triggers include the occurrence of a high priority event, local traffic congestion at the macro cell, or vehicle to vehicle communication. In some embodiments, hybrid device 207 may be dynamically instantiated by radio access network (RAN) based upon a predetermined trigger. Hybrid device 207 would then scan for hybrid device frequencies until it finds hybrid device 209 that is within the coverage area 203 of the stationary transmitting device 201. The message from UE 205 would be sent to hybrid device 207, which in turn will send the message to hybrid device 209. Hybrid device 209 would send a message to the stationary transmitting device 201 that would then transmit the message to UE 211. In an alternate embodiment, the network may detect that UE 205 has moved out of the coverage area 203 and may then instantiate hybrid device 209 that was in the vicinity of UE 205 thereby providing coverage to UE 205.

Figure 3:
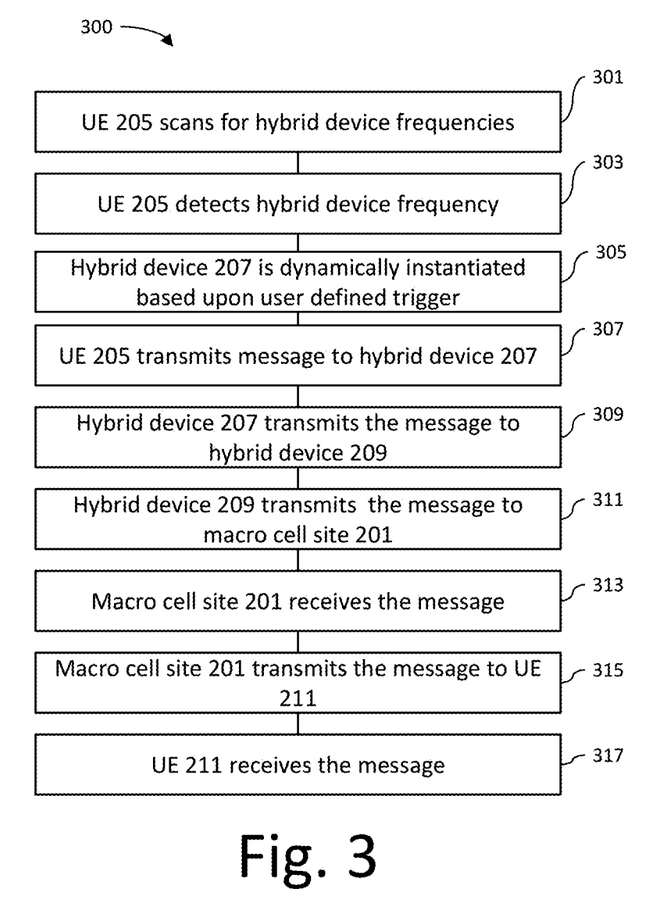
FIG. 3 is a flowchart of an example method for transmitting messages from a user equipment that is outside the coverage area of a stationary transmitting component to a user equipment within the coverage area of the stationary transmitting component.

Illustrated in FIG. 3 is a flowchart of a method 300 implemented by the system 200.

In step 301 UE 205 scans for hybrid device frequencies.

In step 303 UE 205 detects hybrid device frequency.

Step 305 hybrid device 207 is dynamically instantiated based upon user-defined trigger.

In step 307 UE 205 transmits message to hybrid device 207. The message may be transmitted via LTE, or, if hybrid device 207 is within the appropriate range of hybrid device 209 the transmission may be via Bluetooth, near field communication or Wi-Fi.

In step 309 hybrid device 207 transmits the message to hybrid device 209.

In step 311 hybrid device 209 transmits the message to stationary transmitting device 201 such as a macro cell site.

In step 313 stationary transmitting device 201 receives the message.

In step 315 stationary transmitting device 201 transmits the message to UE 211

In step 317 UE 211 receives the message.

Figure 4:
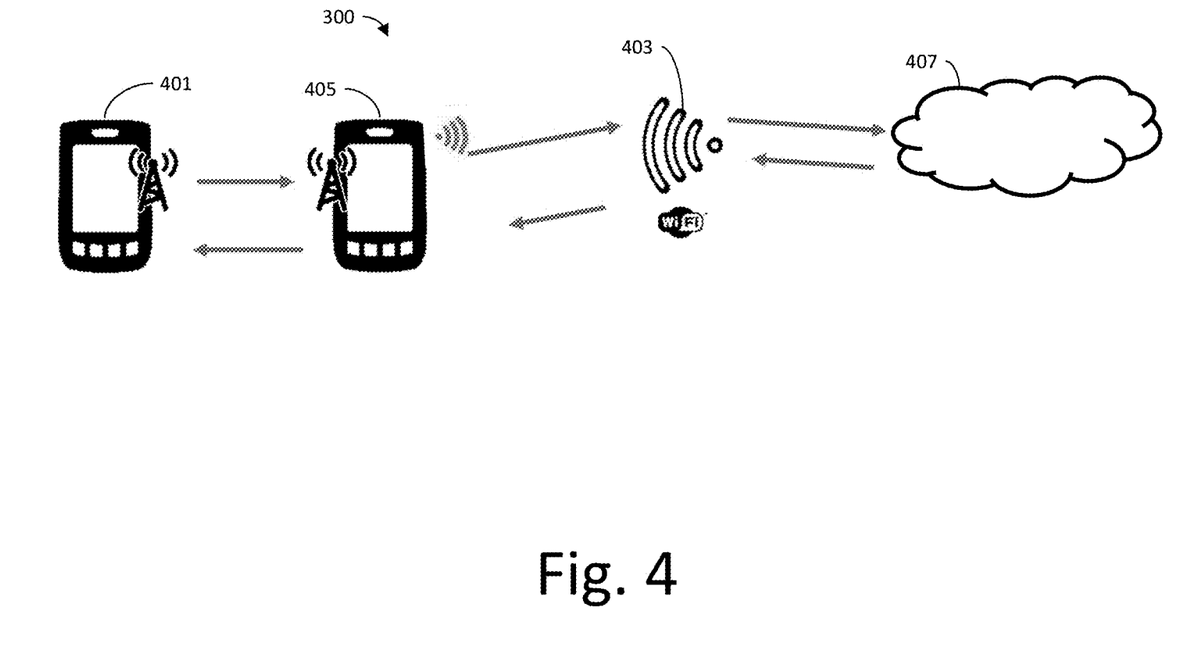
FIG. 4 is a block diagram of an example system through which a hybrid user device can be used to transmit messages from a hybrid user device through a WiFi system to the cloud.

FIG. 4 illustrates a system 400 in which a hybrid device such as hybrid device 100 in FIG. 1 can be used to transmit messages from a device that is not within the coverage area of a stationary WiFi transmitting device (WiFi component) to another device that is within the coverage area of a stationary WiFi and that is backhauled by a non-cellular network. In this example the system includes hybrid device 401 that is out of cellular coverage and not connected to WiFi 403. The system also includes hybrid device 405 is within the coverage area of WiFi 403 that is connected to the internet 407.

Figure 5:
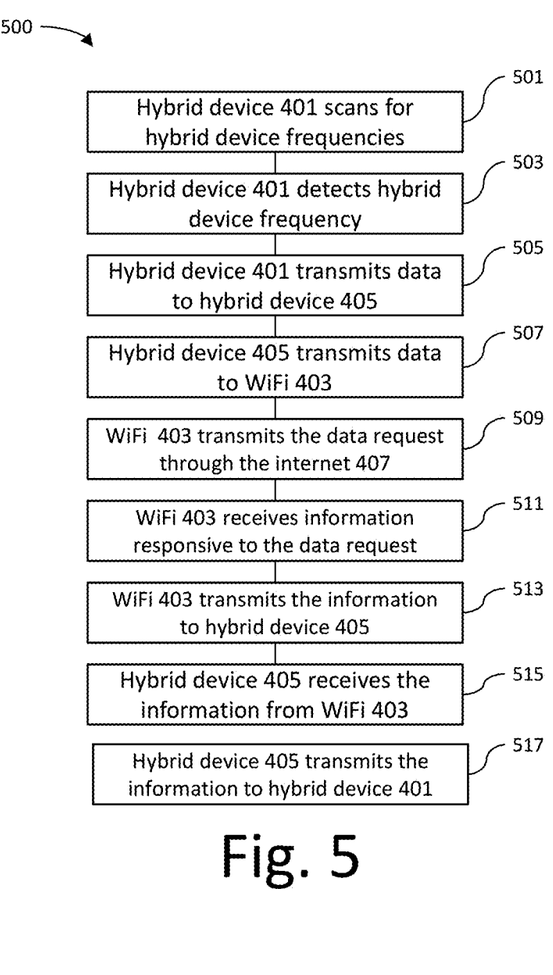
FIG. 5 is a flowchart of an example method for transmitting messages from a hybrid user device through a WiFi system to the cloud.

Illustrated in FIG. 5 is a flowchart of the method implemented by the system 400.

In step 501 hybrid device 401 scans for hybrid device frequencies.

In step 503 hybrid device 401 detects a hybrid device frequency.

In step 505 Hybrid device 401 transmits data to hybrid device 405.

In step 507 Hybrid device 405 transmits data to WiFi 403.

In step 509 WiFi 403 transmits the data request through the internet 407.

In step 511 WiFi 403 receives information responsive to the data request.

In step 513 WiFi 403 transmits the information to hybrid device 405.

In step 515 hybrid device 405 receives the information from WiFi 403.

In step 517 hybrid device 405 transmits the information to hybrid device 401.

Figure 6:
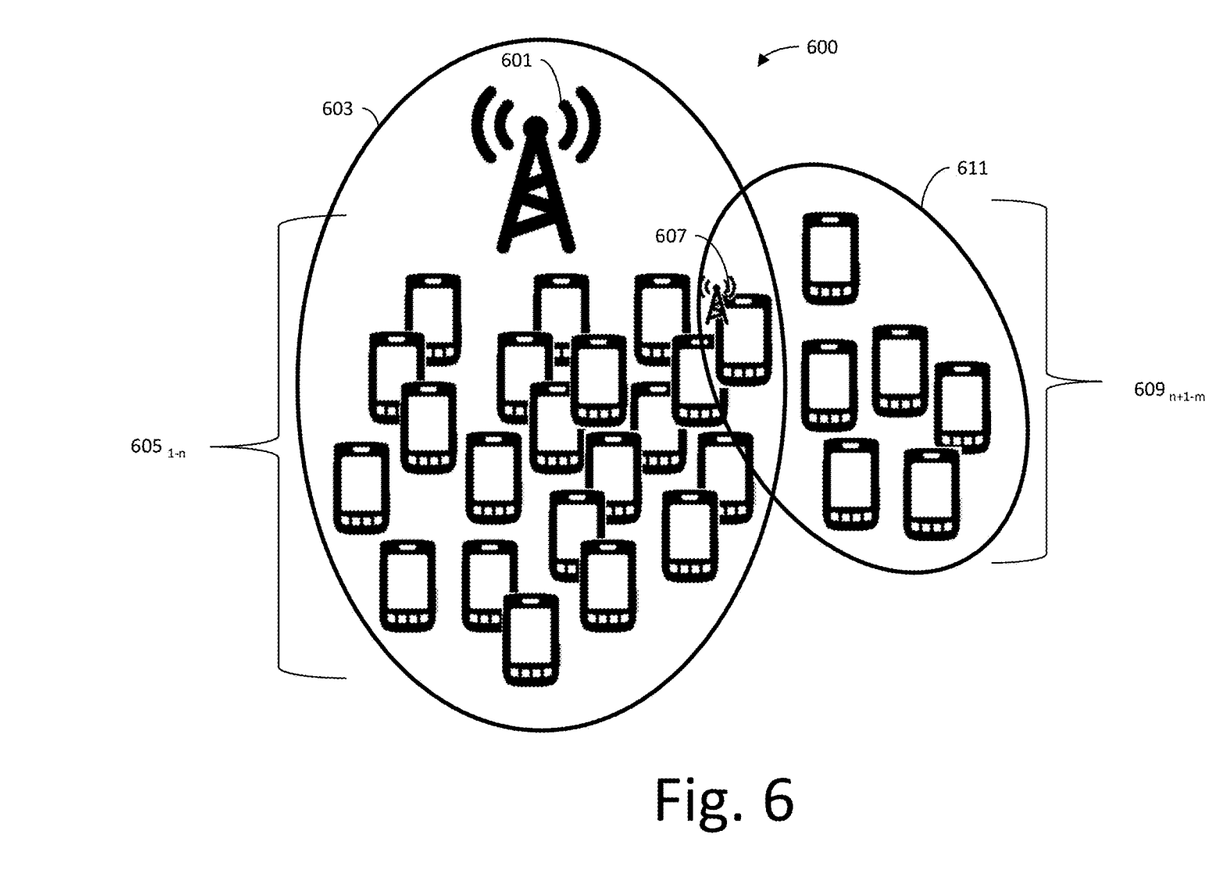
FIG. 6 is a block diagram of an example system for transmit messages from a hybrid user device through a WiFi system to the cloud.

FIG. 6 illustrates a system 600 in which a hybrid device such as hybrid device 100 in FIG. 1 supplements the capacity of a cell tower 601 that has reached its maximum number of simultaneous users. In this example, cell tower 601 having a range area 603 has reached its maximum number of simultaneous users (UE $603_{1-n}$) due to network congestion. Hybrid device 607 is able to connect several devices (UE $609_{n+1-m}$) using its connection to cell tower 601 and provide services to devices within the range of hybrid device 607. In one embodiment, hybrid device 607 may be dynamically instantiated by a cellular network RAN though cell tower 601 when the cellular network detects the network congestion.

Figure 7:
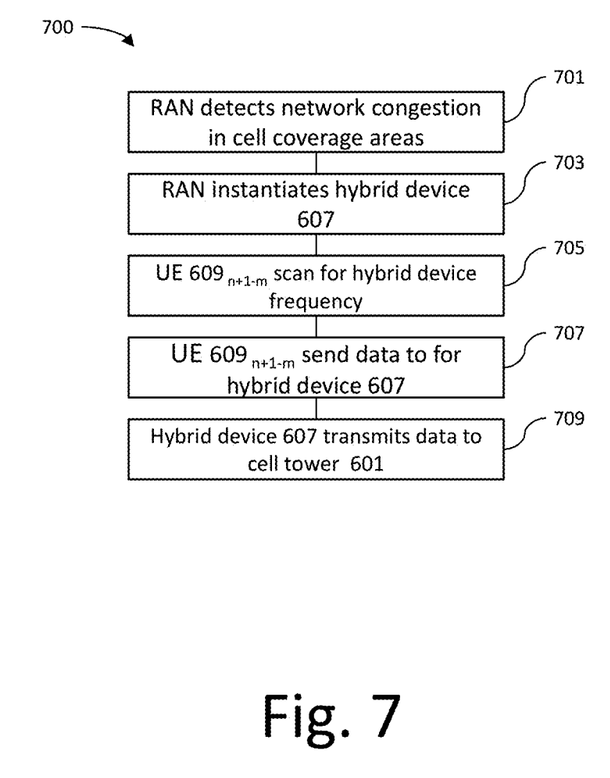
FIG. 7 is a flowchart of an example method for transmitting messages from a hybrid user device through a WiFi system to the cloud.

FIG. 7 is a flowchart of the method implemented by system 600 of FIG. 6.

In step 701 the RAN in the cellular network detects network congestion in the cell coverage area 603.

In step 703 the RAN instantiates hybrid device 607.

In step 705 UEs in the cell coverage area 603 (UE $603_{1-n}$) scan for hybrid device frequency.

In step 707 UE $609_{n+1-m}$ send data to hybrid device 607.

In step 709 hybrid device 607 transmit data to cell tower 601.

Figure 8:
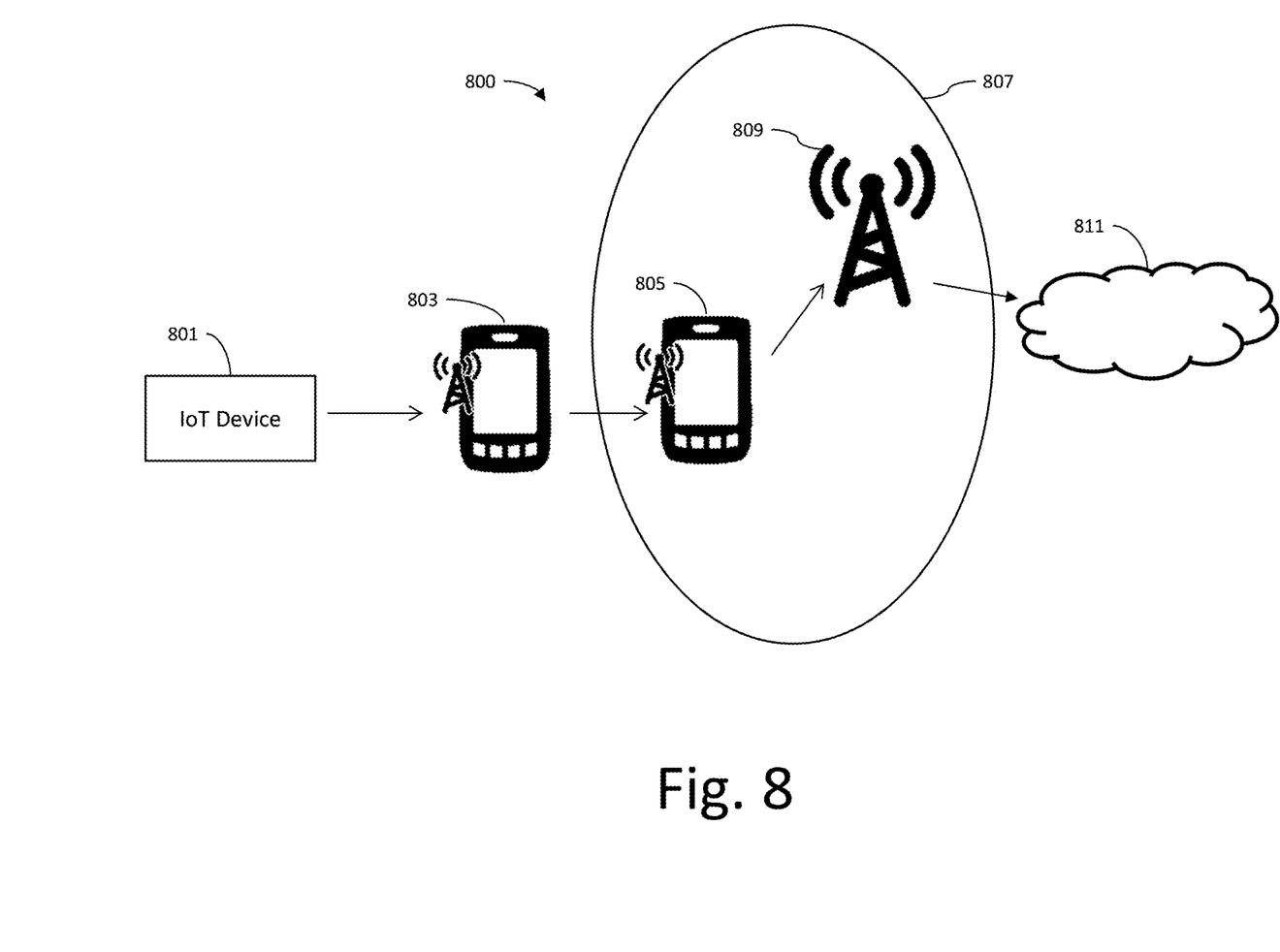
FIG. 8 is a block diagram of an example system for transmitting messages from an IoT device outside of the coverage area of a stationary transmitting component.

In one embodiment, the systems and methods described above may be implemented in an internet of things (IoT) environment as Illustrated in FIG. 8. An IoT device 801 that is out of coverage may broadcast a message using the licensed cellular network LTE which is received by a hybrid device 803. Hybrid device 803 is in range of hybrid device 805 and hybrid device 803 sends the message to hybrid device 805. Hybrid device 805 is in cellular coverage with cellular network, and transmits the message to cell tower 809 which passes the message to the internet 811 over the cellular network.

FIG. 8 is a block diagram illustrating a system 800 for transmitting data from an IoT device 801. The system 800 includes hybrid device 803 that is outside the coverage area 807 of cell tower 809, and hybrid device 805 that is within the coverage area 807 of the cell tower 809. In this example, IoT device 801 send data to hybrid device 803 which in turn sends the data to hybrid device 805. Hybrid device 805 then transmits the data to cell tower 809 that retransmits the data to the internet 811.

The foregoing embodiments have a variety of applications. For example, a propane tank monitor (IoT-Device-1) may be disposed at the edge of cellular coverage. With congestion, in the summer when tree coverage is denser and during some weather the macro coverage shrinks and the device is unable to send messages successfully and burns battery re-trying. There is a road that passes near the tank though and when User 11 carrying a hybrid device drives by the IoT Device-1's message is temporary parked/received and stored on the hybrid device IoT device-1's message on the hybrid device is then forwarded/delivered to the cloud when the hybrid device re-enters coverage.

In another application, the hybrid device may be used in a situation where there is concert and a large number of users simultaneously connected to a single tower. The number of users has exceeded the capacity of the tower. Several concert goers have hybrid devices and are able to connect to other user devices. A hybrid device connected to the tower may be able to connect a plurality of user devices. This offloads the signaling congestion at Tower-1 and 5. Phones-2-20 continue to function.

The foregoing embodiments have particular application in 5G cellular systems. 5G systems will be built to enable logical network slices, which will enable operators to provide networks on an as-a-service basis. Network slicing, in its simplest description, is the ability to tailor a set of functions to optimize use of the network for each mobile device. Network slices are important because the use cases for future 5G networks are diverse and may include: mobile broadband experience everywhere with more video, higher speeds, and wide scale availability; massive machine-type communication such as transportation monitoring and control; mass market personalized TV with big data analytics helping to shape the video experience; and critical machine type communication with remote operation putting both bandwidth and latency demands on the network. Each use case will require a different configuration of requirements and parameters in the network. Each use case will require its own Network Slice.

Today there is a logical network hub in a typical core network where components like the HLR/HSS and GGSN route all traffic to its destination or to another device. With 5G "network slicing" elements of the network may be brought closer to the node that is doing the transaction. Hybrid devices extends that concept by creating a localized version of network routing and logic that could be stored on the hybrid device. The hybrid device may act as a slimmed down version of an HLR where the device would know how to pass along data traffic to the next available user in the mesh. The hybrid device may build upon the device side logic and could store information that could be periodically updated from the network (or other devices acting as network nodes) on things like power levels to know how broadly it is needed to transmit, information on uplink/downlink channels, or policy to determine when to accept offloaded traffic from a congested site, etc. With the application of multiple input, multiple output MIMO technology the hybrid device may be adjusted dynamically or switched using a MIMO uplink and/or downlink capacity in order to accommodate real time service requirement.

While the specification describes illustrative examples of certain aspects of the disclosure, one of ordinary skill can devise variations of these aspects without departing from the described concept. For example, any disclosure referring to circuit-switched network elements may be equally applicable to packet-switched domain network elements.

Reference to information and signals may be interpreted as using a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, methods and algorithms described in connection with the examples disclosed herein may be implemented as hardware, software, or combinations of both. To clearly illustrate this interchangeability of hardware and software, various illustrative components, blocks, modules, circuits, methods and algorithms have been described above generally in terms of their functionality. The described functionality may be implemented in different ways for each application, but such implementation decisions should not be interpreted as causing a departure from the scope of the present invention.

The various illustrative logical blocks, components and modules, described in connection with the examples may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

The methods described in the examples may be embodied directly in hardware, in a software module executed by a processor, or in a combination of the two. A software module may reside in any form of memory or storage medium such as RAM memory, flash memory, ROM memory, EPROM memory, EEPROM memory, registers, hard disk, a removable disk, a CD-ROM. The memory or storage medium may be coupled to the processor such that the processor can read information from, and write information to, the memory or storage medium. Alternatively, the storage medium may be integral to the processor. The processor and the storage medium may reside in an ASIC. In some aspects, the steps and/or actions of a method may reside as one or any combination or set of codes and/or instructions on a machine readable medium and/or computer readable medium, which may be incorporated into a computer program product.

In any of the exemplary embodiments, the described functions may be implemented in hardware, software, firmware, or any combination thereof. Functions implemented in software may be stored on or transmitted over as instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed:

1. A method comprising:
   scanning for a first hybrid mobile device frequency with a first mobile device disposed outside a coverage area of a stationary base station;
   connecting the first mobile device to a first hybrid mobile device that is outside the coverage area wherein the first hybrid mobile device comprises a user equipment module and a first femtocell including a communication platform that enable processing and manipulation of signals received and transmitted by the first femtocell component in accordance with various radio technology protocols;
   instantiating, based upon a user defined trigger, the first femtocell of the first hybrid mobile device;
   scanning, using the first hybrid mobile device, for a second hybrid mobile device frequency;
   detecting a second hybrid mobile device having a second femtocell wherein the second hybrid mobile device is in the coverage area of the stationary base station;
   sending a message from the first mobile device to the first hybrid mobile device;
   sending the message from the first hybrid mobile device to the second hybrid mobile device;
   sending the message from the second hybrid mobile device to the stationary base station; and
   sending the message from the stationary base station to a mobile device.

2. The method of claim 1 wherein the user defined trigger comprises an occurrence of a high priority event.

3. The method of claim 1 wherein the user defined trigger comprises local traffic congestion at the stationary base station.

4. The method of claim 1 wherein the user defined trigger comprises a vehicle to vehicle communication.

5. The method of claim 1 wherein instantiating the first femtocell component comprises instantiating the first femtocell component through a command generated by a third user equipment.

6. The method of claim 1 wherein instantiating the first femtocell comprises instantiating the first femtocell through a command generated by a network.

7. The method of claim 1, wherein the first mobile device is a non-hybrid mobile device.

8. The method of claim 7, wherein the non-hybrid mobile device is an Internet-of-Things device.

9. A system comprising:
   a stationary base station;
   a first mobile device disposed outside an area of coverage of the stationary base station;
   a second mobile device disposed inside the area of coverage of the stationary base station;
   a first hybrid mobile device disposed outside the area of coverage of the stationary base station, wherein the first hybrid mobile device comprises:
     a first user equipment module;
     a first femtocell; and
     a first processor;
   a second hybrid mobile device disposed inside the area of coverage of the stationary base station, wherein the second hybrid mobile device comprises:
     a second user equipment module;
     a second femtocell; and
     a second processor;
   wherein the first processor is configured to:
     instantiate the first femtocell based upon a user defined trigger;
     direct a transmission of a message from the first mobile device to the second hybrid mobile device;
   wherein the second processor is configured to:
     transmit the message from the second hybrid mobile device to the stationary base station; and
   wherein the stationary base station transmits the message to the second mobile device.

10. The system of claim 9 wherein the user defined trigger comprises an occurrence of a high priority event.

11. The system of claim 9 wherein the user defined trigger comprises local traffic congestion at the stationary base station.

12. The system of claim 9 wherein the user defined trigger comprises a vehicle to vehicle communication.

13. The system of claim 9 wherein the first femtocell is instantiated through a command generated by the first mobile device.

14. The system of claim 9 wherein the first femtocell is instantiated through a command generated by a network.

15. The system of claim 9, wherein the first mobile device is a non-hybrid user device that is outside the area of coverage of the stationary base station.

16. The system of claim 15, wherein the non-hybrid user device is an Internet-of-Things device.

17. A non-transitory computer readable media comprising program code that when executed by a programmable processor causes the programmable processor to execute a method, the non-transitory computer readable media comprising:
   scanning for a first hybrid mobile device frequency with a first mobile device disposed outside a coverage area of a stationary base station;
   connecting the first mobile device to a first hybrid mobile device that is outside the coverage area wherein the first hybrid mobile device comprises a user equipment module and a first femtocell component including a communication platform that enable processing and manipulation of signals received and transmitted by the first femtocell component in accordance with various radio technology protocols;
   instantiating, based upon a user defined trigger, the first hybrid mobile device;
   sending a message from the first user equipment to the first hybrid mobile device;
   sending the message from the first hybrid mobile device to a second hybrid mobile device;
   sending the message from the second hybrid mobile device to the stationary base station; and
   sending the message from the stationary base station to a second mobile device.

18. The non-transitory computer readable media of claim 17 wherein the user defined trigger comprises occurrence of a high priority event.

19. The non-transitory computer readable media of claim 17 wherein the user defined trigger comprises local traffic congestion at the stationary base station.

20. The non-transitory computer readable media of claim 17 wherein the user defined trigger comprises a vehicle to vehicle communication.

* * * * *